W. A. NEVILLE.
SILO.
APPLICATION FILED FEB. 1, 1916.
1,187,370.
Patented June 13, 1916.
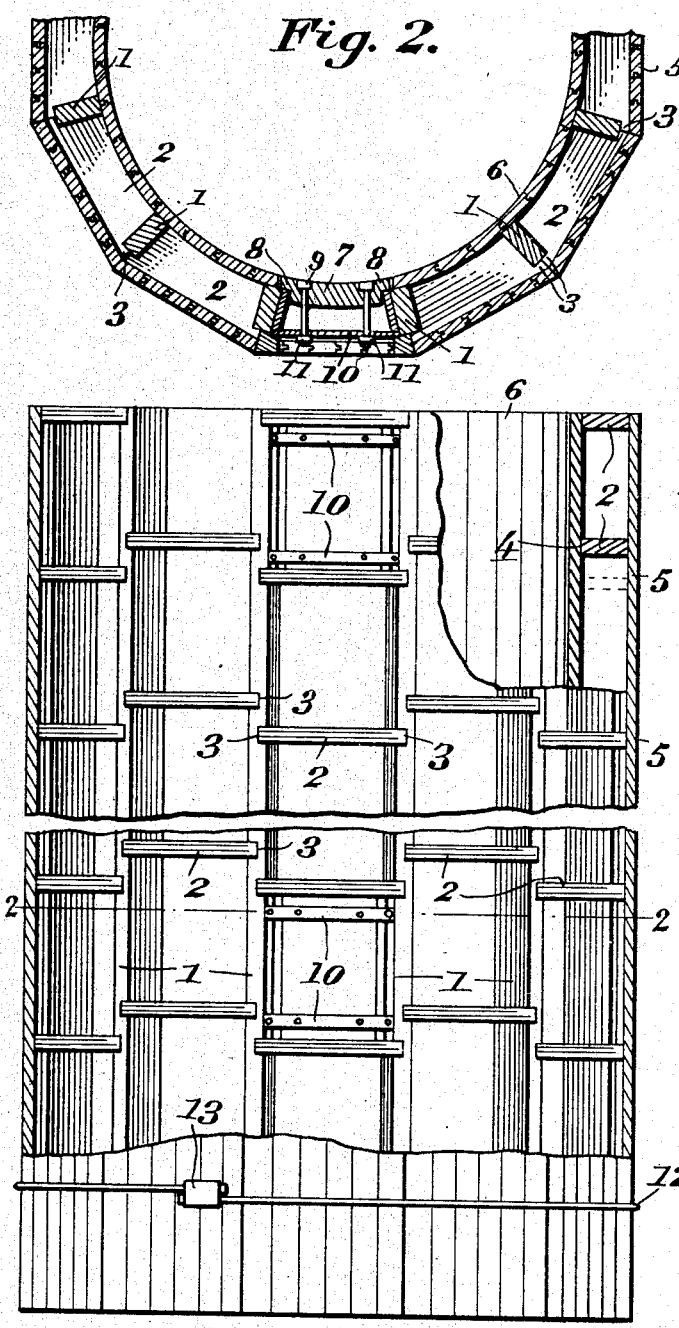

UNITED STATES PATENT OFFICE.

WILLIAM A. NEVILLE, OF SUMNER, NEBRASKA.

SILO.

1,187,370.  Specification of Letters Patent.  Patented June 13, 1916.

Application filed February 1, 1916. Serial No. 75,579.

*To all whom it may concern:*

Be it known that I, WILLIAM A. NEVILLE, a citizen of the United States, residing at Sumner, in the county of Dawson and State of Nebraska, have invented certain new and useful Improvements in Silos, of which the following is a specification.

This invention relates to improvements in silos and more particularly to silos of the double or hollow walled type.

An object of my invention is to provide a silo which may be built up for the most part of stock lumber and timbers of the usual sizes, and which has the walls thereof so arranged on the supporting frame-work that all of the joints thereof are tight, thus establishing a dead air space between the walls, the wall structure acting to brace the frame structure in all of its parts to overcome any tendency toward sagging or twisting of the parts, and the entire structure being so arranged that when the silo is suitably hooped, substantially all danger of bulging is eliminated.

With these and other objects in view the invention consists in the novel details of construction and arrangement of parts which will be more clearly understood from the following description and drawings, in which, Figure 1 is a front elevation with parts broken away, Fig. 2 is a fragmental horizontal section on the line 2—2 of Fig. 1, and Fig. 3 is a fragmentary perspective view showing details of the frame structure and the manner of connecting the members together.

In carrying out my invention, I provide a plurality of circumferentially spaced vertical standards indicated at 1 and said standards are connected by means of a plurality of vertically spaced strips 2, said strips 2 being provided on the outer edge with projections or extensions 3 which extend across the outer face of the standards, the extensions 3 being made of such length that they project over the outer edge faces of the standards through substantially one-half of the width thereof and thus the extensions of the several vertically spaced strips secured on each side of the standards, will project to have their corners on the outer ends thereof in substantially vertical alinement. The inner faces of the strips 2 are curved as indicated at 4, the purpose of which will be presently described. As is clearly shown in Figs. 1 and 3 of the drawing, the several strips 2 are arranged in staggered position, the purpose of which will be later described.

The outer wall indicated at 5 comprises a plurality of vertically extending strips which are secured to the exterior surface of the strips 2 by nailing or in any other suitable manner. The inner wall 6 comprises a plurality of vertically extending strips adapted to be secured to the curved faces 4 of the strips 2, by nailing or in any other suitable manner. The strips comprising the outer wall 5 and inner wall 6 may be of any grade lumber and are preferably of what is known as flooring, the inner wall, preferably being formed of a higher grade of material than is necessary for the outer wall. It will be seen that the inner wall comprises a continuous circular member, whereby the ensilage will pack tightly so as to prevent any spaces in which air might accumulate. The outer wall 5 as well as the inner wall 6 may be coated with any desired waterproofing material.

By arranging the strips 2 in the staggered relation, it is possible to nail directly through the vertical standards 1, which are preferably timbers substantially rectangular in cross section, into the ends of the cross strips 2, this staggering of the strips allowing direct nailing into each of the same without interference from the next adjacent strip and without the necessity of toe-nailing or nailing through the projections or extensions 3. As is shown, the outer edges of the strips 2 are straight and the arrangement of these strips is such that the projections 3 extend to have their corners in substantially vertical alinement along the outer edges of the individual standards 1 to form therewith a framework which, when viewed in plan, presents a substantially polygonal outline, the curving of the inner edges of the cross members making a circular inner line for the frame structure.

The removable door sections are indicated at 7 and are provided with the side flanges 8 adapted to engage the sides of the door frame, as more clearly illustrated in Fig. 2 of the drawing. Bolts 9 are secured to the door 7 and the threaded ends are adapted to pass through metal strips 10 secured across the door frame. Nuts 11 may be received on the threaded ends of the bolts 9 for holding the door sections in position.

Hoops 12 encircle the outer wall 5 and the ends 12 are connected by any suitable couplings, as indicated at 13.

Having fully described the details of construction, it is thought that the manner of constructing the silo as well as the advantages thereof will be clearly understood. It will be seen that I have provided a silo which is simple and inexpensive in construction and which can be constructed from the desired grade of lumber. By having the strips 2, between the standards 1, of the shape shown, a continuous circular inner wall is formed as previously described and the outer wall will be of the shape shown. Both the strips comprising the inner and outer walls are secured to the strips 2 and it will be seen that an air space is left between the inner and outer walls. This will preferably be a dead air space thereby preventing the freezing of the ensilage in the silo. As previously described, both the inner and outer walls are preferably constructed of what is known as flooring and have a tongue and groove connection, thereby excluding air and at the same time, making a neat joint, the corners of the outer line of the frame being made angular without the necessity of shaping, or in any way cutting the upright timbers 1 and permitting the outer covering to be fitted tightly at these corners or edges between the polygonally arranged faces of the outer wall. The door sections are removed for filling the silo and when the silo is filled the door sections are securely held in position against accidental displacement.

It will be understood that any suitable construction of ladder may be attached to the silo in the ordinary way.

I claim—

1. A silo comprising a plurality of vertical frame standards, frame strips mounted across between said frame standards and rabbeted at their ends to receive the standards and to extend over the outer faces thereof with the extreme ends terminating in vertical alinement, inner wall structures secured to the frame standards and cross members, and wall structures secured over the outer edges of the cross members and the projecting ends thereof to form the outer wall of the silo.

2. A silo comprising a plurality of vertical frame standards arranged at spaced apart points to describe substantially a circular outline, frame strips mounted across between said frame standards and rabbeted at their ends to receive the standards and to extend over the outer faces thereof with the extreme ends terminating in vertical alinement, the frame strips shaped on their inner faces to form a substantially circular inner line and the arrangement of the frame strips presenting polygonal shaped outlines, wall strips secured over the curved inner edges of the frame strips and the inner faces of the frame standards forming an inner wall for the silo, and like wall strips secured over the outer edges of the frame strips and the projecting ends thereof forming an outer wall.

In testimony whereof I affix my signature in presence of two witnesses.

WILLIAM A. NEVILLE.

Witnesses:
B. R. HEDLIN.
B. O'MEARA.

Copies of this patent may be obtained for five cents each, by addressing the "Commissioner of Patents, Washington, D. C."